(12) United States Patent
Kamada

(10) Patent No.: US 9,519,201 B2
(45) Date of Patent: Dec. 13, 2016

(54) SHUTTER HOLDING MECHANISM

(71) Applicant: OLYMPUS CORPORATION, Shibuya-ku, Tokyo (JP)

(72) Inventor: Ryuji Kamada, Kokubunji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/745,958

(22) Filed: Jun. 22, 2015

(65) Prior Publication Data

US 2016/0139492 A1 May 19, 2016

(30) Foreign Application Priority Data

Nov. 19, 2014 (JP) ................................. 2014-234882
Nov. 19, 2014 (JP) ................................. 2014-234883

(51) Int. Cl.
*G03B 9/08* (2006.01)
*G03B 17/02* (2006.01)

(52) U.S. Cl.
CPC ................. *G03B 9/08* (2013.01); *G03B 17/02* (2013.01)

(58) Field of Classification Search
CPC ............. G03B 9/42; G03B 9/18; G03B 17/02; G03B 9/08
USPC .................................. 396/456, 452, 484, 486
See application file for complete search history.

(56) References Cited

U.S. PATENT DOCUMENTS 5,708,892 A * 1/1998 Kon .......................... G03B 9/42
396/452

FOREIGN PATENT DOCUMENTS

| JP | 54107334 A | 8/1979 |
| JP | 06067259 A | 3/1994 |
| JP | 09189939 A | 7/1997 |
| JP | 09244099 A | 9/1997 |
| JP | 2000330033 A | 11/2000 |
| JP | 2005215014 A | 8/2005 |
| JP | 2011107439 A | 6/2011 |

OTHER PUBLICATIONS

Japanese Office Action (and English translation thereof) dated Sep. 15, 2015, issued in counterpart Japanese Application No. 2014-234882.
Japanese Office Action (and English translation thereof) dated Sep. 15, 2015, issued in counterpart Japanese Application No. 2014-234883.

* cited by examiner

*Primary Examiner* — Rochelle-Ann J Blackman
(74) *Attorney, Agent, or Firm* — Holtz, Holtz & Volek PC

(57) ABSTRACT

A shutter holding mechanism includes: a shutter substrate which is provided inside a camera body and in which a focal-plane type shutter unit is fixed; a pressing unit arranged between the camera body and a side of one end portion of the shutter substrate, the pressing unit pressing the shutter substrate to a side of another end portion of the shutter substrate relative to the camera body; and a damper unit arranged in a part on a side of the camera body corresponding to the side of the other end portion of the shutter substrate, which is a side opposite to a part where the pressing unit is arranged, in a direction along a travel direction of a shutter blade of the shutter unit, the damper unit absorbing movement of the shutter substrate pressed by the pressing unit.

13 Claims, 9 Drawing Sheets

SHUTTER HOLDING MECHANISM

CROSS REFERENCE TO RELATED APPLICATIONS

This application claims the benefit of Japanese Applications No. 2014-234882 filed in Japan on Nov. 19, 2014, No. 2014-234883 filed in Japan on Nov. 19, 2014, the contents of which are incorporated herein by this reference.

BACKGROUND OF THE INVENTION

1. Field of the Invention

The present invention relates to a shutter holding mechanism for holding a focal-plane type shutter unit inside a camera body.

2. Description of the Related Art

Conventionally, it is common that an image pickup apparatus that picks up an optical image formed by an image pickup optical system using an image pickup device and the like (hereinafter referred to as a camera and the like) is configured by fixedly holding a shutter unit configured with a shutter blade (a light shielding blade) that opens and closes an optical path of the image pickup optical system and a driving mechanism, driving circuit and the like that drive the shutter blade at an appropriate timing, inside a camera body.

As the shutter unit provided in a conventional camera and the like, a so-called focal-plane type shutter unit is generally widespread which is configured, for example, by arranging the shutter blade traveling parallel to a light receiving surface of an image pickup device near a front surface side of the image pickup device.

In the conventional camera provided with the focal-plane type shutter unit, when the shutter blade is driven to perform an opening/closing operation of the shutter blade, for example, when the shutter blade starts traveling, travel reaction acts on a shutter frame member holding the shutter blade to cause this (the shutter frame member) to move in a direction opposite to the travel direction of the shutter blade. Further, when the travel of the shutter blade stops at a predetermined position, the shutter blade comes into contact with a predetermined fixed member in the travel direction, and there is a possibility that impact occurs. Furthermore, there may be a case that rotation-direction power is imposed on the shutter frame member at that time.

In such a case, when the power that occurs in the travel direction of the shutter blade at the time of driving the shutter unit is transmitted to a camera body side, it will cause the camera body to vibrate. Furthermore, there is a possibility that, when the vibration and the like are transmitted to an image pickup unit that includes the image pickup device and the like, a lens barrel and the like via the camera body, adverse effects such as image blur may occur in an acquired image as a result, and this has been a problem.

Therefore, in the conventional camera to which the focal-plane type shutter unit is applied, and the like, devices are made, such as providing a buffer member having elasticity between the camera body and the shutter unit at the time of fixedly holding the shutter unit inside the camera body. Due to the configuration, the shutter unit is permitted to move within a predetermined range. The configuration is made so that, by the travel reaction and the like of the shutter blade that occur at the time of driving the shutter unit acting on the shutter unit itself and causing this (the shutter unit) to move within the predetermined range, the vibration and the like that occur at the time of driving the shutter unit are absorbed.

As for the shutter holding mechanism in which devices for reducing and preventing vibration and the like that are caused by the power that occurs at the time of driving the shutter unit being transmitted to the camera body are made as described above, various kinds of such shutter holding mechanisms are proposed, for example, by Japanese Patent Application Laid-Open Publication No. 6-67259, Japanese Patent Application Laid-Open Publication No. 9-189939, Japanese Patent Application Laid-Open Publication No. 9-244099 and the like and have been put to practical use.

SUMMARY OF THE INVENTION

A shutter holding mechanism of an embodiment of the present invention is provided with: a shutter substrate which is provided inside a camera body and in which a focal-plane type shutter unit is fixed; a pressing unit arranged between the camera body and a side of one end portion of the shutter substrate, the pressing unit pressing the shutter substrate to a side of another end portion of the shutter substrate relative to the camera body; and a damper unit arranged in a part on a side of the camera body corresponding to the side of the other end portion of the shutter substrate, which is a side opposite to a part where the pressing unit is arranged, in a direction along a travel direction of a shutter blade of the shutter unit, the damper unit absorbing movement of the shutter substrate pressed by the pressing unit.

A shutter holding mechanism of another embodiment of the present invention is provided with: a shutter substrate including a focal-plane type shutter unit and an opening portion through which an object light passes, wherein a long groove is formed parallel to a travel direction of a shutter blade of the shutter unit; a pressing unit arranged between the camera body and a side of one end portion of the shutter substrate, the pressing unit pressing the shutter substrate to the side of another end portion of the shutter substrate relative to the camera body; a damper unit arranged in a part on a side of the camera body corresponding to the side of the other end portion of the shutter substrate, which is a side opposite to a part where the pressing unit is arranged, in a direction along a travel direction of a shutter blade of the shutter unit, the damper unit absorbing movement of the shutter substrate pressed by the pressing unit; and a plurality of receiving portions formed at least three positions on the camera body and forming a receiving surface at a time of the shutter substrate moving in a direction perpendicular to an optical axis of the object light on an outer side of the opening portion of the shutter substrate; wherein one of the plurality of receiving portions is engaged with the long groove formed on the shutter substrate to guide the shutter substrate to move in the travel direction of the shutter blade, and enable the shutter substrate to rotate with the receiving portion engaged with the long groove as a center.

The benefits of the present invention will be further apparent from the detailed description below.

DETAILED DESCRIPTION OF THE PREFERRED EMBODIMENTS

Figure 1:
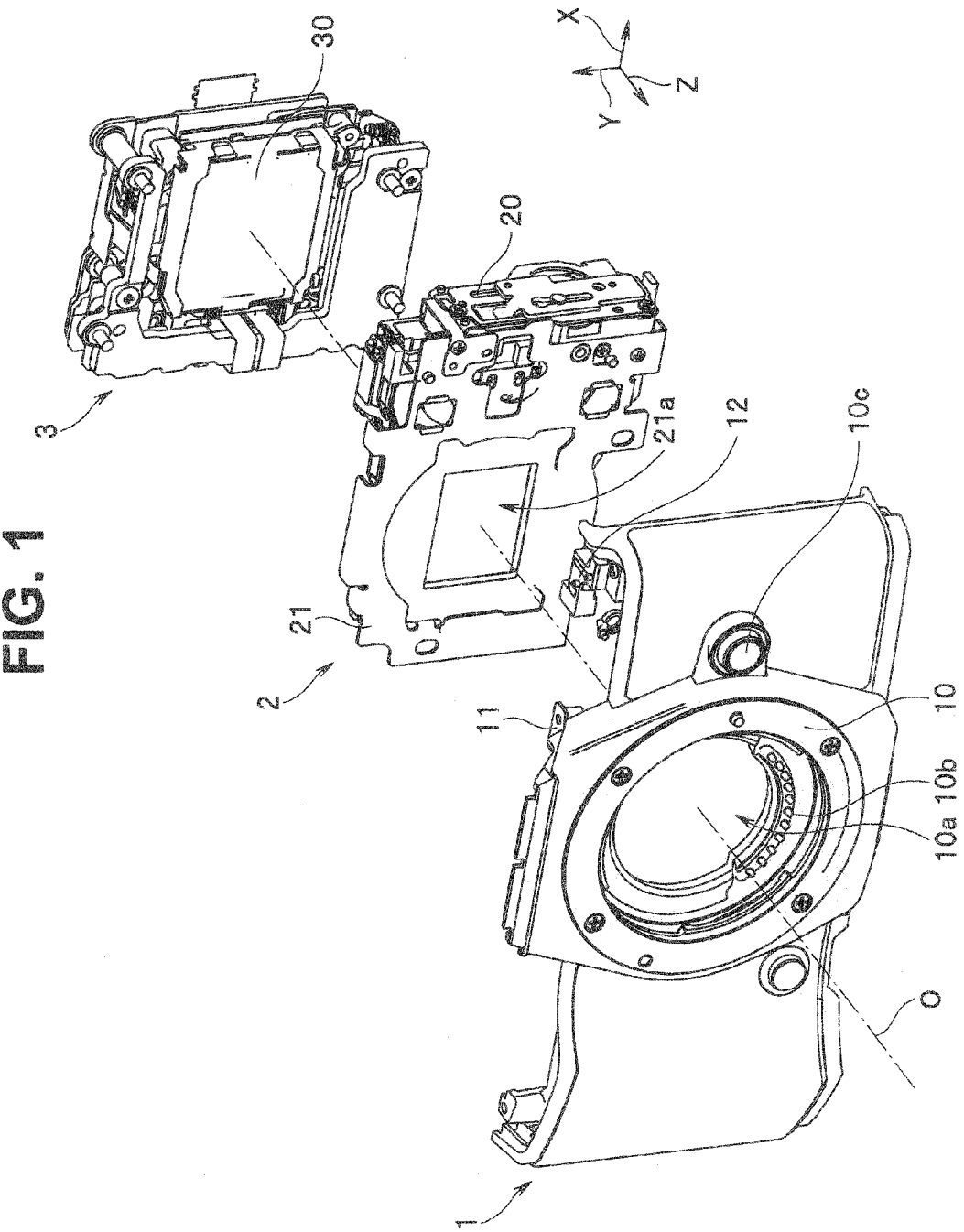
FIG. 1 is an exploded perspective view showing a part of configuration members of a camera provided with a shutter holding mechanism of a first embodiment of the present invention when the camera is disassembled.

The present invention will be described below by embodiments shown in drawings. Each embodiment described below shows an example of applying the present invention to an image pickup apparatus which sequentially performs photoelectric conversion of optical images formed by an image pickup optical system using a photoelectric conversion device or the like (hereinafter referred to as an image pickup device), for example, a CCD (charge coupled device) image sensor or a CMOS (complementary metal oxide semiconductor) type image sensor, and stores an image signal obtained thereby into a storage medium as image data in a predetermined form (for example, digital image data indicating a still image or a movie), and which is configured being provided with an image display device for reproducing and displaying the still image or the movie on the basis of the digital image data stored in the storage medium, for example, an LCD (liquid crystal display) or an OEL (organic electro-luminescence) display, for example, a digital camera or a video camera (hereinafter simply referred to as a camera).

Note that, when the camera is placed on a stand such as a table in a normal attitude state, an axis in a right and left horizontal direction relative to the camera is assumed to be an X axis, an axis orthogonal to the X axis and in an upper and lower vertical direction relative to the camera is assumed to be a Y axis, and an axis orthogonal to both of the X and Y axes and in a forward and rearward direction relative to the camera is assumed to be a Z axis in each embodiment below. Here, the Z axis is assumed to be an axis parallel to an optical axis O of the image pickup optical system (not shown) of the camera, including a direction corresponding to the optical axis O. Further, the above optical axis O is assumed to be an axis line that passes through a substantial center of a light receiving surface of the image pickup device.

Further, in each embodiment below, it is assumed that, in a direction along the optical axis O (a Z-axis direction), a side facing a front surface of the camera (a side where an object is) is referred to as "forward", and a side where the image pickup device is arranged close to a rear surface of the camera is referred to as "rearward".

Each drawing used in the description below is schematic, and dimensional relationships, reduced scale and the like of each member may be shown differently for each component so as to recognizably show each component on the drawing. Therefore, as for the number of components, shapes of the components, ratios of sizes of the components, relative positional relationships among the respective components, and the like described in each of the drawings, the present invention is not limited to the form shown in the drawing.

[First Embodiment]

FIG. 1 is an exploded perspective view showing a camera provided with a shutter holding mechanism of a first embodiment of the present invention when the camera is disassembled. Note that, in FIG. 1, only a part of a main configuration unit of the camera in the present embodiment, which is a configuration unit related to the present invention, is taken out and shown, and all configuration units in the camera are not shown.

Figure 2:
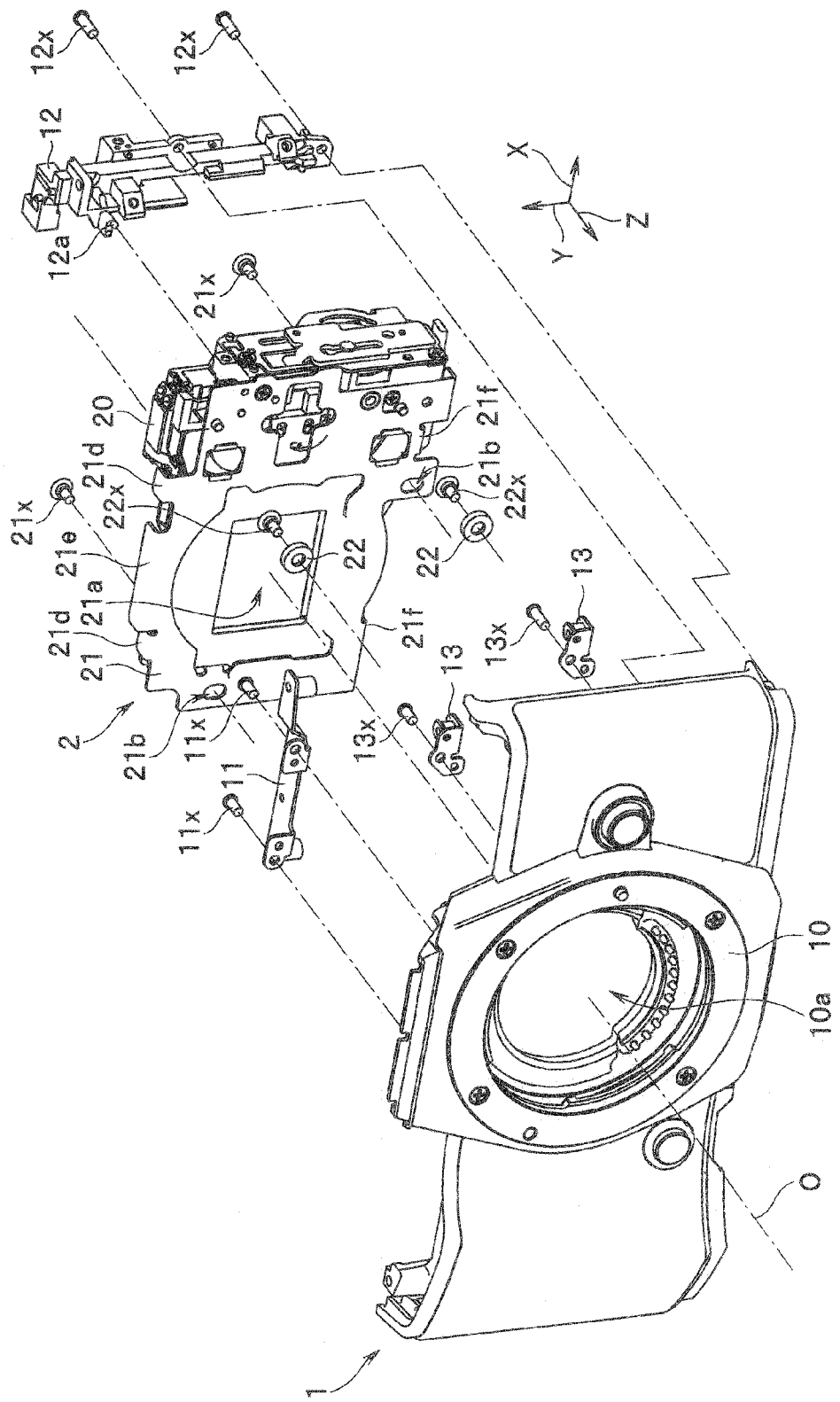
FIG. 2 is an exploded perspective view of a main part showing the shutter holding mechanism of the present embodiment.

FIG. 2 is an exploded perspective view of a main part showing the shutter holding mechanism of the present embodiment. In FIG. 2, a part of a camera body (a front cover member) and configuration members around a shutter unit in the main configuration unit shown in FIG. 1 are taken out and shown, and the shutter holding mechanism is shown, being disassembled.

Figure 3:
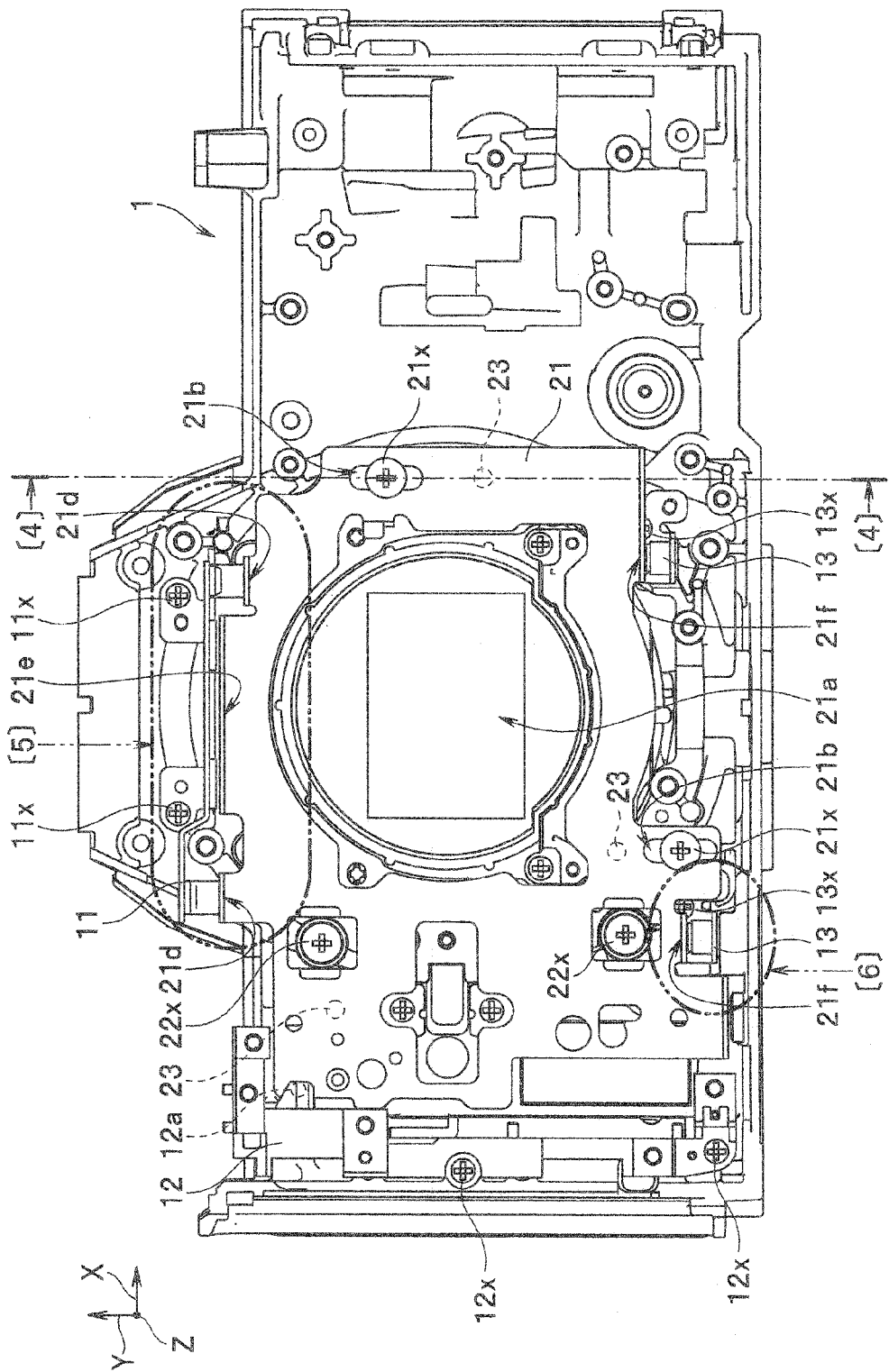
FIG. 3 is an assembly diagram showing a state that the shutter holding mechanism is attached inside a front cover member, in the camera to which the shutter holding mechanism of the present embodiment is applied.

FIG. 3 is an assembly diagram showing a state that the shutter holding mechanism is attached inside a part of the camera body (the front cover member), in the camera to which the shutter holding mechanism of the present embodiment is applied. In FIG. 3, in order to show a configuration of the shutter holding mechanism attached inside the part of the camera body (the front cover member), a state when the part of the camera body (the front cover member) is shown from a rear surface side is shown, and the shutter unit fitted to the shutter holding mechanism is not shown.

Figure 4:
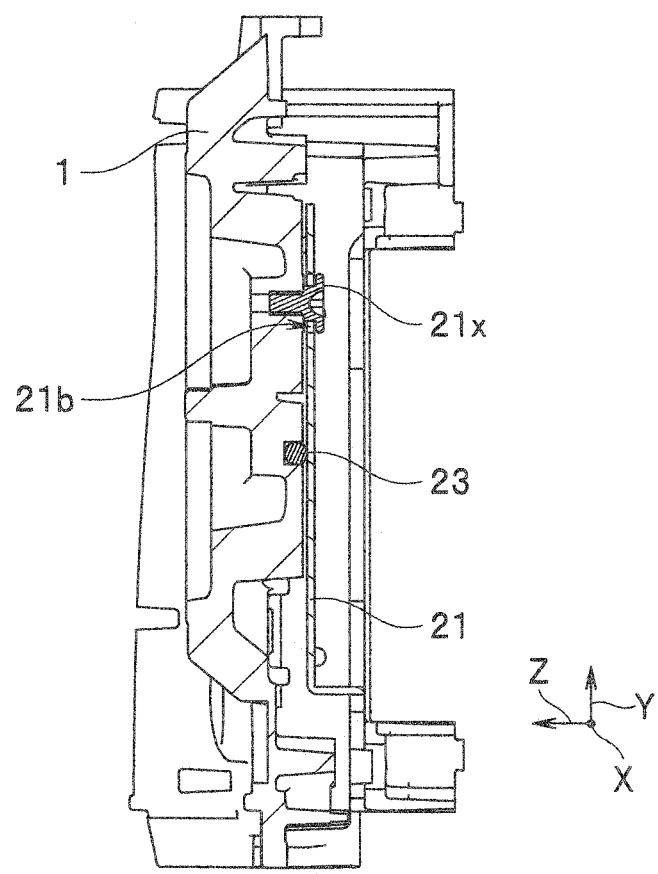
FIG. 4 is a longitudinal sectional view along a line indicated by reference numeral [4]-[4] in FIG. 3.
Figure 5:
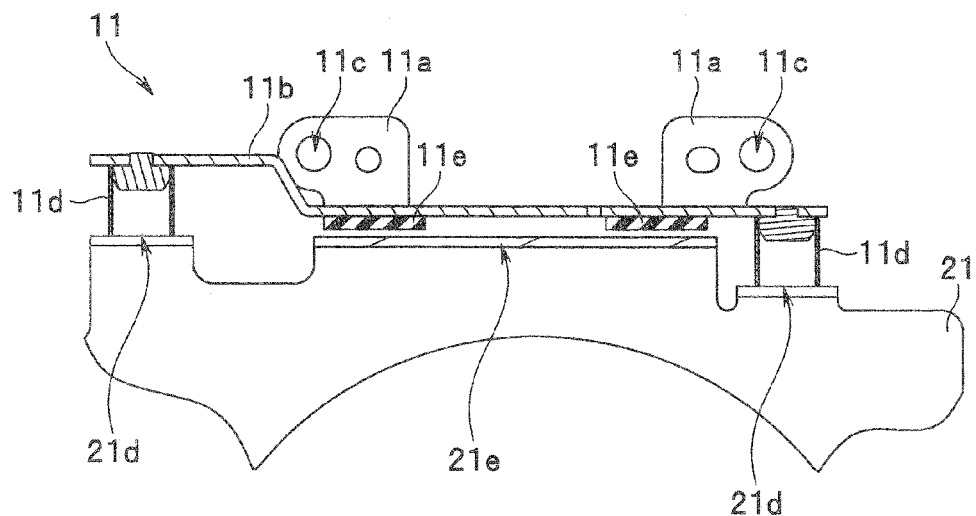
FIG. 5 is an enlarged sectional view of a main part showing a section of a part of an enlarged region indicated by reference numeral [5] in FIG. 3.
Figure 6:
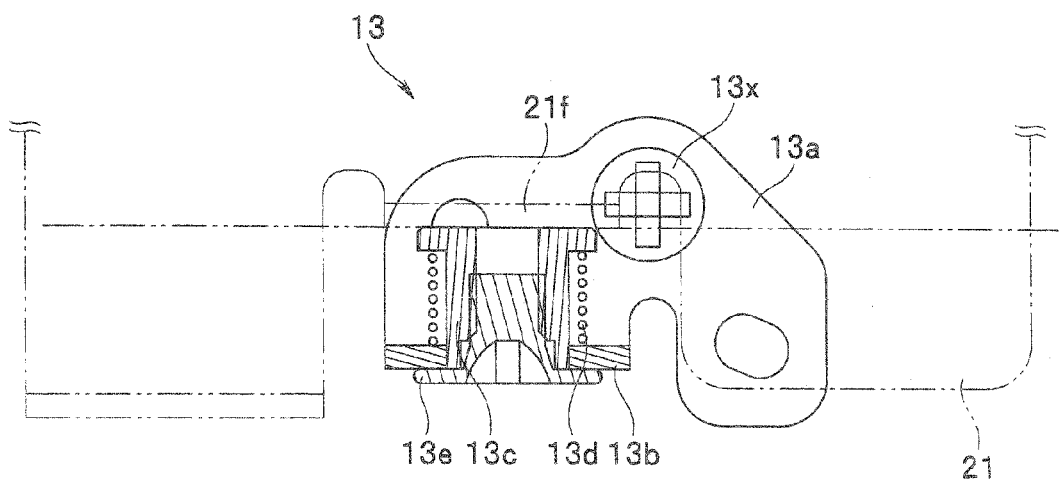
FIG. 6 is an enlarged sectional view of a main part showing a section of a part of an enlarged region indicated by reference numeral [6] in FIG. 3.

FIG. 4 is a longitudinal sectional view along a line indicated by reference numeral [4]-[4] in FIG. 3. FIG. 5 shows a pressing spring unit which is pressing means in the shutter holding mechanism of the present embodiment and is a pressing unit, and FIG. 5 is an enlarged sectional view of a main part showing a section of a part of an enlarged region indicated by reference numeral [5] in FIG. 3. FIG. 6 shows a damper unit which is damper means in the shutter holding mechanism of the present embodiment, and FIG. 6 is an enlarged sectional view of a main part showing a section of a part of an enlarged region indicated by reference numeral [6] in FIG. 3. Note that FIGS. 4 to 6 show the main parts, omitting member configurations other than the main parts, in order to avoid complexity of the drawings. For example, FIG. 4 mainly shows a positional relationship between each of a front cover member 1, a slider 21 and a screw 21x and a spherical rolling member (a ball) 23. FIG. 5 mainly shows a positional relationship between the slider 21 and a pressing spring unit 11. FIG. 6 mainly shows a positional relationship between the slider 21 and a damper unit 13.

The shutter holding mechanism of the present embodiment is a configuration portion for holding a focal-plane type shutter unit relative to a configuration member constituting the camera body, inside the camera body.

More specifically, for example, as shown in FIG. 1, a shutter unit 2 is held in a rear section of the front cover member 1 constituting a part of the camera body via the shutter holding mechanism of the present embodiment such that the shutter unit 2 is movable only in a predetermined direction (to be described in detail later; a travel direction of a shutter blade). Further, on the rearward side of the shutter unit 2, an image pickup unit 3 is arranged.

The front cover member 1 is a part of a configuration member constituting a part of the camera body. The front cover member 1 is an exterior cover member formed so as to cover front-surface-side and bottom-surface-side parts of the camera. At a substantially central part of the front cover member 1, a piercing opening 10*a* in an almost circular shape is formed. On the front surface of the front cover member 1, a mount ring 10, which is a mount portion for detachably arranging a lens barrel (not shown) provided with an image pickup optical system, is arranged on a peripheral portion of the opening 10*a*.

On an inner side of the mount ring 10, an electrical contact 10*b* for electrically connecting the camera and the lens barrel (not shown) fitted to the camera, and the like are connected. Further, on a peripheral portion of the mount ring 10 on the front surface side of the front cover member 1, various operation members such as a lens attaching/detaching button 10*c* are arranged.

A configuration is made so that, by fitting the lens barrel (not shown) via the mount ring 10, an object image that is optically formed by the image pickup optical system of the lens barrel is formed on a light receiving surface of an image pickup device 30 of the image pickup unit 3 arranged rearward inside the camera body.

As described above, the camera form shown as an example in the present embodiment is an interchangeable lens camera. Note that, since a mechanism for attaching/detaching the front cover member 1 and the lens barrel (not shown) is a part which is not directly related to the present invention, detailed description thereof will be omitted on the assumption that a mechanism in the same configuration as that of a conventional interchangeable lens camera in a general configuration is applied.

The image pickup unit 3 is a configuration unit configured being provided with, in addition to the image pickup device 30 which is a photoelectric conversion device, a driving circuit which drives the image pickup device 30 to perform a photoelectric conversion process, and the like, a so-called image stabilization mechanism for correcting image blur and the like by moving the image pickup device 30 within a plane parallel to its light receiving surface, a driving circuit therefor, and the like. The image pickup device 30 of the image pickup unit 3 is arranged with its light receiving surface facing the front surface side of the camera, that is, facing the opening 10*a* of the front cover member 1. Further, the image pickup device 30 is arranged such that its center substantially corresponds to the optical axis O of the lens barrel (not shown) fixed to the camera. Note that, since the image pickup unit 3 itself which is configured as above is a part which is not directly related to the present invention, detailed description thereof will be omitted on the assumption that an image pickup unit in the same configuration as that of a conventional camera in a general configuration is applied.

The shutter unit 2 is arranged in an area between the front cover member 1 constituting a part of the camera body and the image pickup unit 3 in an internal space of the camera. The shutter unit 2 is held such that it is movable only in the predetermined direction (to be described in detail later; the travel direction of the shutter blade) via the shutter holding mechanism of the present embodiment in the rear section of the front cover member 1 as described above.

The shutter unit 2 is a configuration unit configured with a shutter blade (a light shielding blade; not shown) which opens and closes an optical path of the image pickup optical system of the lens barrel (not shown), a shutter driving portion 20 including a driving mechanism, a driving circuit and the like for driving the shutter blade (not shown) at an appropriate timing, and the like.

The form of the shutter unit 2 shown as an example in the present embodiment is a so-called focal-plane type shutter unit configured by arranging the shutter blade (not shown) traveling parallel to the light receiving surface of the image pickup device 30 near the front surface side of the image pickup device 30. Since the configuration of the shutter unit 2 itself is a part which is not directly related to the present invention, detailed description thereof will be omitted on the assumption that a shutter unit in the same configuration as that of a conventional camera in a general configuration is applied.

Note that, in the camera to which the shutter holding mechanism of the present embodiment is applied, the travel direction of the shutter blade (not shown) of the shutter unit 2 is a direction along the Y axis (the upper and lower vertical direction relative to the camera). It is assumed that, when the shutter unit 2 is driven, the shutter blade (not shown) travels from downward to upward relative to the camera in a normal attitude state.

Here, a detailed configuration of the shutter holding mechanism of the present embodiment will be described below with the use of FIGS. 2 to 6.

The shutter holding mechanism of the present embodiment is configured mainly with the slider 21, the pressing spring unit 11 which is a pressing unit, a slider weight 12, the damper unit 13 and the like.

The slider 21 is a shutter substrate to which the shutter unit 2 is fixed. The slider 21 (the shutter substrate) is attached to an inner-side surface of the front cover member 1 so as to be movable only in a direction along the travel direction of the shutter blade (not shown) of the shutter unit 2 (a Y-axis direction) by a structure, to be described later.

The slider 21 is formed by performing bending processing of a rigid plate member, for example, made of metal. The shutter unit 2 is fixed to the slider 21 as described above. More specifically, as shown in FIGS. 1 and 2, the shutter driving portion 20 of the shutter unit 2 is fixed on one end side in an X-axis direction on the rear surface side of the slider 21. Further, a piercing opening 21*a* is formed at a substantially central part of the slider 21. The shutter blade (not shown) is included near the opening 21*a*.

Note that, in a state that the shutter unit 2 is attached to the front cover member 1 via the shutter holding mechanism including the slider 21, and, further, the image pickup unit 3 is joined on the rearward side thereof, the opening 21*a* of the slider 21 is set so as to be arranged at a position where the center of the opening 21*a* almost corresponds to both of the center of the opening 10*a* of the front cover member 1 and the center of the light receiving surface of the image pickup device 30 simultaneously. Thereby, a light path of light from an object which is transmitted through the image pickup optical system of the lens barrel (not shown) fitted via the mount ring 10 of the front cover member 1 and enters the camera is secured. The shutter blade (not shown) of the shutter unit 2 opens and closes the opening 21*a* at an appropriate timing accompanying an image pickup operation.

As shown in FIG. 3, in a state that the slider 21 is attached to the front cover member 1 (the state in FIG. 3), a plurality of bent portions are formed at both Y-axis direction ends of the slider 21. More specifically, on one end portion side (an upper end side in the present example) of the slider 21, a plurality of bent portions 21d, 21e which are bent rearward are formed along the Z-axis direction. Here, two bent portions 21d are formed, and the two bent portions 21d are arranged sandwiching the other bent portion 21e. The plurality of bent portions 21d, 21e, 21d are formed on a side edge portion on the one end portion side (the upper end side) in the Y-axis direction from an area where the opening 21a of the slider 21 is formed.

Further, on the other end portion side (a lower end side in the present example) of the slider 21, a plurality of (two in the present example) bent portions 21f which are bent rearward are formed along the Z-axis direction. The two bent portions 21f are formed from the area where the opening 21a of the slider 21 is formed on a side edge portion on the other end portion side (the lower end side) in the Y-axis direction from the area where the opening 21a of the slider 21 is formed.

The plurality of bent portions 21d, 21e, 21f are regions which the pressing spring unit 11 and the damper unit 13 come into contact with and act on, though details will be described later.

Further, as shown in FIG. 3, the slider 21 is fixedly held relative to an inner surface side of the front cover member 1 by two screws 21x and the slider weight 12 such that movement in the Z-axis direction is restricted. Here, the slider weight 12 is fixed to the inner surface side of the front cover member 1 by the two screws 12x. As shown in FIGS. 2 and 3, an arm portion 12a projecting in the X-axis direction is formed on the slider weight 12. A spherical convex portion arranged projecting forward is formed on the arm portion 12a. When the slider 21 is attached to the inner side surface of the front cover member 1, and the slider weight 12 is in a state of being fixed to a predetermined position of the front cover member 1 by the screws 12x (the state in FIG. 13), the spherical convex portion of the arm portion 12a of the slider weight 12 comes into point contact with one side edge portion (a corner part) of a plane on the rear surface side of the slider 21 and supports the slider 21 in the Z-axis direction. Simultaneously, the slider 21 is fixedly held by the two screws 21x in a long hole 21b made near the other side edge portion and in a long hole 21b made near a side edge portion close to the other end portion while movement in the Z-axis direction is restricted. Here, the long holes 21b are formed, having a longer axis in the Y-axis direction. Therefore, by such a configuration, the slider 21 is permitted to move in the Y-axis direction while movement in the Z-axis direction is restricted.

In other words, in the present embodiment, a configuration is made by providing the screws 21x, which are convex-shaped portions, such that they project from the inner side surface of the front cover member 1 (the camera body) and providing the long holes 21b, which are opening portions, at predetermined regions of the slider 21 (the shutter substrate) corresponding to the screws 21x. Here, the long holes 21b are formed, having a longer axis in the Y-axis direction as described above. By the configuration, the slider 21 (the shutter substrate) is caused to be movable only in the direction along the travel direction of the shutter blade (not shown) of the shutter unit by the screws 21x (the convex-shaped portions) and the long holes 21b (openings).

Note that, though the form of providing the convex-shaped portions (the screws 21x) on a front cover member 1 side and providing the opening portions (the long holes 21b) on a slider 21 side is shown in the present embodiment, the present invention is not limited to such an example. For example, a form of providing the opening portions (the long holes 21b) on the front cover member 1 side and providing the convex-shaped portions (the screws 21x) on the slider 21 side is also possible, and an operation and advantageous effects obtained thereby are quite similar to those obtained in the case of the configuration of the present embodiment.

Thus, the slider 21 is supported at three points in the Z-axis direction. In this case, the support points in the Z-axis direction are a contact region of the spherical convex portion, a screw 21x near the other side edge portion, which is a region almost opposite to the position of the spherical convex portion with the opening 21a therebetween, and a screw 21x near the other end portion side (the lower end side) of a region almost opposite to the two support points with the opening 21a therebetween. That is, the slider 21 is supported in the Z-axis direction at three points arranged almost equally in a circumference direction on a peripheral portion of the opening 21a.

Further, three rolling members (balls) 23 intervene between the slider 21 and the front cover member 1 as shown in FIG. 4. The three rolling members 23 are also arranged almost equally in the circumference direction on the peripheral portion of the opening 21a and support the slider 21 at the three points from the front surface side.

Furthermore, on the slider 21, X axis restricting portions which restrict X-axis direction movement of the slider 21 are provided at two positions on an area which is substantially the central part of the slider 21 and which is outside the opening 21a. The X axis restricting portion restricts the X-axis direction movement of the slider 21 and permits Y-axis direction movement of the slider 21. Further, the X axis restricting portion fixedly holds the slider 21 relative to the front cover member 1 (at two positions) using a screw 22x with a roller 22 rotatably intervening between the front cover member 1 and the screw 22x to cause the movement to be smoothly performed.

Therefore, the roller 22 is put and arranged in each opening formed in the slider 21. The openings are formed, having a longer axis in the direction along the travel direction of the shutter blade (not shown) (the Y-axis direction). Further, the openings are formed such that width dimension is almost equal to or a little wider than a diameter of the roller 22. Thereby, the roller 22 permits the Y-axis direction movement of the slider 21 while restricting the X-axis direction movement of the slider 21, and causes the movement to be smoothly performed.

The pressing spring unit 11 is a pressing unit which presses the slider 21 against the front cover member 1 toward the other end portion side of the slider 21. Therefore, the pressing spring unit 11 is fixed to the inner side surface of the front cover member 1 constituting a part of the camera body with screws 11x. Here, the pressing spring unit 11 is arranged at a position facing one side edge portion of one end portion side (the upper end side) of the slider 21 (the shutter substrate).

Here, a detailed configuration of the pressing spring unit 11 will be described. As shown in FIG. 5, the pressing spring unit 11 is configured with a base portion 11b formed by performing bending processing of a rigid plate member, for example, made of metal, a plurality of (two in the present example) energizing members 11d each of which is made of, for example, a coil spring or the like, a buffer member 11e having elasticity, and the like.

The base portion 11b is formed, having two arm portions 11a in which screw holes 11c for attaching the pressing spring unit 11 to the front cover member 1 are made, respectively. On both end portions of the base portion 11b, the energizing members 11d are arranged, respectively. The two energizing members 11d are fixedly arranged on a base portion 11b side, at positions facing the two bent portions 21d, 21d of the slider 21, respectively, when the pressing spring unit 11 is in a state of being attached to the front cover member 1 (the state in FIG. 3). Note that distal end sides of the two energizing members 11d are in a state of being in contact with counterfaces of the two bent portions 21d, 21d, respectively.

Further, in a region at a middle of the base portion 11b, the buffer member 11e is arranged being adhered, for example, by a double-sided tape or the like. Here, the buffer member 11e is fixedly arranged on the base portion 11b side, with a gap between the buffer member 11e and the bent portion 21e of the slider 21 (having an interval from the bent portion 21e), at a position facing the bent portion 21e when the pressing spring unit 11 is in the state of being attached to the front cover member 1 (the state in FIG. 3). Here, the gap between an outer edge portion of one end portion side (the upper end side) of the slider 21 and the buffer member 11e of the pressing spring unit 11 is provided to permit the Y-axis direction movement of the slider 21.

On the other hand, the damper unit 13 is a damper unit for absorbing movement vibration of the slider 21 (the shutter substrate) pressed by the pressing spring unit 11. Therefore, the damper unit 13 is fixed to the inner side surface of the front cover member 1 constituting a part of the camera body with screws 13x. Here, the damper unit 13 is arranged in a predetermined region opposite to the region where the pressing spring unit 11 is arranged, in the direction along the travel direction of the shutter blade (not shown) of the shutter unit 2 (the Y-axis direction), that is, at a position facing one side edge portion of the other end portion side (the lower end side) of the slider 21 (the shutter substrate). Note that, in the present embodiment, an example in which a plurality of (two) damper units 13 are arranged is shown.

Here, a detailed configuration of the damper unit 13 will be described. As shown in FIG. 6, the damper unit 13 is configured with a substrate 13a having a bent portion 13b, an elastic member 13d, a cylinder 13c, a cover screw 13e and the like.

The substrate 13a is a main configuration portion formed by performing bending processing of a rigid plate-shaped member, for example, made of metal. On the substrate 13a, the bent portion 13b bent rearward is formed along the Z-axis direction. The bent portion 13b is arranged at a position facing a bent portion 21f on the other end portion side (the lower end side) of the slider 21 when the damper unit 13 is attached to a predetermined region of the front cover member 1. Further, a piercing hole through which a cylindrical portion of the cylinder 13c to be described later is insertedly arranged is made in the bent portion 13b.

The elastic member 13d is a member having elasticity, for example, a coil spring. The elastic member 13d is arranged in a state of being wound on an outer circumferential surface of the cylinder 13c when the damper unit 13 is in a state of being assembled, and the elastic member 13d is expandably and contractibly arranged between an inner side surface of a flange portion of the cylinder 13c and an inner side surface of the bent portion 13b as described later.

The cylinder 13c is a first tube member which is formed, being provided with a flange portion having a receiving portion, which is a surface receiving the bent portion 21f on the other end portion side (the lower end side) of the slider 21 (the shutter substrate) pressed by the pressing spring unit 11, and a cylindrical portion around which the elastic member 13d is woundly arranged. The flange portion of the cylinder 13c is formed on one end of the cylindrical portion.

When the damper unit 13 is in the state of being assembled, the other end of the cylindrical portion of the cylinder 13c is insertedly arranged in the piercing hole of the bent portion 13b of the substrate 13a. In this state, the elastic member 13d is woundly arranged around the cylindrical portion of the cylinder 13c. At this time, one end of the elastic member 13d is in contact with the inner side surface (a surface on a side opposite to the receiving portion (a rear surface side)) of the flange portion of the cylinder 13c. Further, the other end of the elastic member 13d is in contact with the inner side surface of the bent portion 13b of the substrate 13a. Thereby, the elastic member 13d is expandably and contractibly arranged between the inner side surface of the flange portion (the receiving portion) of the cylinder 13c and the inner side surface of the bent portion 13b as described above.

The cover screw 13e is a second tube member which is formed being provided with a cylindrical portion engaged with the other end of the cylindrical portion of the cylinder 13c (the first tube member), and a flange portion formed at one end of the cylindrical portion. When the damper unit 13 is in the state of being assembled, the cylindrical portion of the cover screw 13e is engagedly arranged at the other end of the cylinder 13c which is insertedly arranged in the piercing hole formed on the bent portion 13b of the substrate 13a. At this time, an inner side surface of the flange portion of the cover screw 13e is in contact with the bent portion 13b of the substrate 13a. Thereby, the flange portion of the cover screw 13e functions as a positioning portion which performs positioning of the slider 21 relative to the camera body.

In the damper unit 13 configured as described above, the substrate 13a having the bent portion 13b is fixed to the inner side surface of the front cover member 1 (the camera body) with the screws 13x. The cylinder 13c and the cover screw 13e are integrally arranged on the substrate 13a. At this time, the elastic member 13d is expandably and contractibly arranged between the inner side surface of the flange portion (the receiving portion) of the cylinder 13c and the inner side surface of the bent portion 13b. In other words, the elastic member 13d is arranged between the flange portion (the receiving portion) of the cylinder 13c and the camera body (the bent portion 13b of the substrate 13a fixed to the camera body).

By this configuration, when the flange portion (the receiving portion) of the cylinder 13c receives the other end portion side (the bent portion 21f on the other end portion side) of the slider 21 (the shutter substrate), the cylinder 13c and the cover screw 13e move in the direction along the Y-axis direction (the travel direction of the shutter blade of the shutter unit) relative to the front cover member 1 (the camera body). Here, the cylinder 13c and the cover screw 13e are moving members which are integrally configured and move by being engaged with each other as described above.

When the shutter holding mechanism of the present embodiment is in a normal state, the bent portion 21f (the shutter substrate) of the slider 21 is in a state of being in contact with the flange portion (the receiving portion of the flange portion) of the cylinder 13c as described above. That is, at this time, the slider 21 is in a state of being placed on the flange portion (the receiving portion of the flange portion) of the cylinder 13c by its own weight.

When, in this state, the shutter unit is driven, and the shutter blade (not shown) travels from one end portion side (the lower end side) of the slider 21 toward the other end portion side (the upper end side) in the Y-axis direction, the slider 21 on which the shutter unit is placed moves in a direction opposite to the travel direction of the shutter blade in response to travel reaction of the travel and the like. Then, in response thereto, the moving member (what is configured integrally with the cylinder 13c and the cover screw 13e) also moves in the same direction. Therefore, at this time, the elastic member 13d expands in the direction along the travel direction of the shutter blade (not shown) of the shutter unit in the Y-axis direction. Simultaneously, the bent portion 21e of the slider 21 comes into contact with the buffer member 11e. Thereby, the elastic member 13d and the buffer member 11e absorb movement vibration of the slider 21.

On the other hand, depending on an external force or the like received then, the slider 21 may move in the same direction as the travel direction of the shutter blade. In this case, the moving member (what is configured integrally with the cylinder 13c and the cover screw 13e) moves in the same direction. Then, at this time, the elastic member 13d contracts in the direction along the travel direction of the shutter blade (not shown) of the shutter unit in the Y-axis direction. Thereby; the elastic member 13d absorbs the movement vibration of the slider 21.

In this way, the damper unit 13 absorbs the movement vibration of the slider 21 (the shutter substrate) against the front cover member 1 (the camera body) by the moving member (13c, 13e) moving in the Y-axis direction, which is along the travel direction of the shutter blade, and causing the elastic member 13d to expand/contract.

As described above, according to the above first embodiment, a configuration is made such that the movement vibration of the slider 21 is absorbed by holding the slider 21 (the shutter substrate) on which the focal-plane type shutter unit is fixedly arranged, relative to the front cover member 1 (the camera body) such that it is movable only in the direction along the travel direction of the shutter blade (the Y-axis direction) and providing the pressing spring unit 11 and the damper unit 13 at one end portion and the other end portion of the slider 21 in the Y-axis direction.

Therefore, by such a configuration, the slider 21 (the shutter substrate) on which the shutter unit is fixedly arranged can be in such a structure that the slider 21 is movable in the travel direction of the shutter blade (the Y-axis direction) by the pressing spring unit 11 and the damper unit 13 and, in the normal state, can be always held in a stable state.

Further, by causing the slider 21 to move together with the shutter unit by the travel reaction of the shutter blade generated at the time of driving the shutter unit, and the pressing spring unit 11 and the damper unit 13 absorbing vibration of the movement, it is possible to reduce and suppress the vibration and the like transmitted to the camera body side. Therefore, it is possible to reduce vibration and the like of the camera body, the image pickup unit and the like which occur accompanying driving of the shutter unit and, therefore, prevent occurrence of image blur and the like. Therefore, it is possible to always obtain a preferable image pickup result.

Furthermore, the slider 21 is in such a structure that the slider 21 is held relative to the front cover member 1 such that movement in the X-axis direction is restricted by the roller 22, and movement in the Z-axis direction is restricted by the screws 21x (the convex-shaped portions) and the long holes 21b (the opening portions) at two positions while only movement in the Y-axis direction is permitted.

Therefore, by such a configuration, it is possible to cause the slider 21 on which the shutter unit is fixedly arranged to move only in one desired, specified direction, that is, only in the Y-axis direction, which is the travel direction of the shutter blade, and, therefore, it is possible to secure stability of the position of the shutter unit inside the camera body.

[Second Embodiment]

Next, a shutter holding mechanism of a second embodiment of the present invention will be described below. A configuration of the present embodiment is basically almost similar to that of the first embodiment described above, and only a part thereof is slightly different. Therefore, in description below about the present embodiment, same reference numerals will be given to same components as those of the first embodiment, and detailed description thereof will be omitted. Only different configuration portions will be described in detail. Note that, as for the configuration portions common to the above first and present embodiments, the drawings shown in the description of the first embodiment will be referred to.

Figure 7:
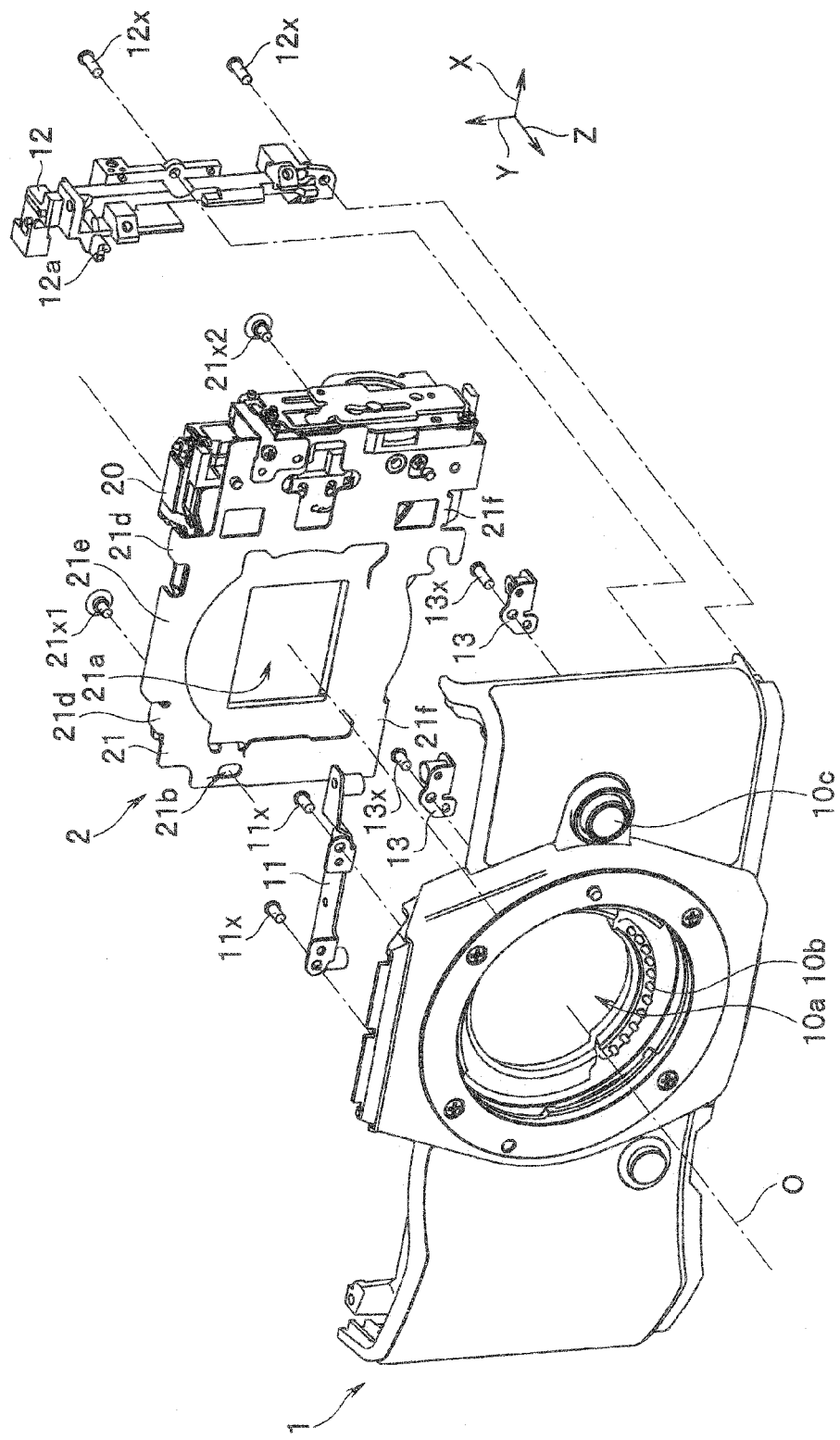
FIG. 7 is an exploded perspective view of a main part showing a camera provided with a shutter holding mechanism of a second embodiment of the present invention when the camera is disassembled.

FIG. 7 is an exploded perspective view of a main part showing a camera provided with the shutter holding mechanism of the second embodiment of the present invention when the camera is disassembled. In FIG. 7, configuration members around a shutter unit, including a part of a camera body (a front cover member) and the shutter holding mechanism, among main configuration units of the camera of the present embodiment, are taken out and shown. Especially, the shutter holding mechanism is further disassembled and shown.

Figure 8:
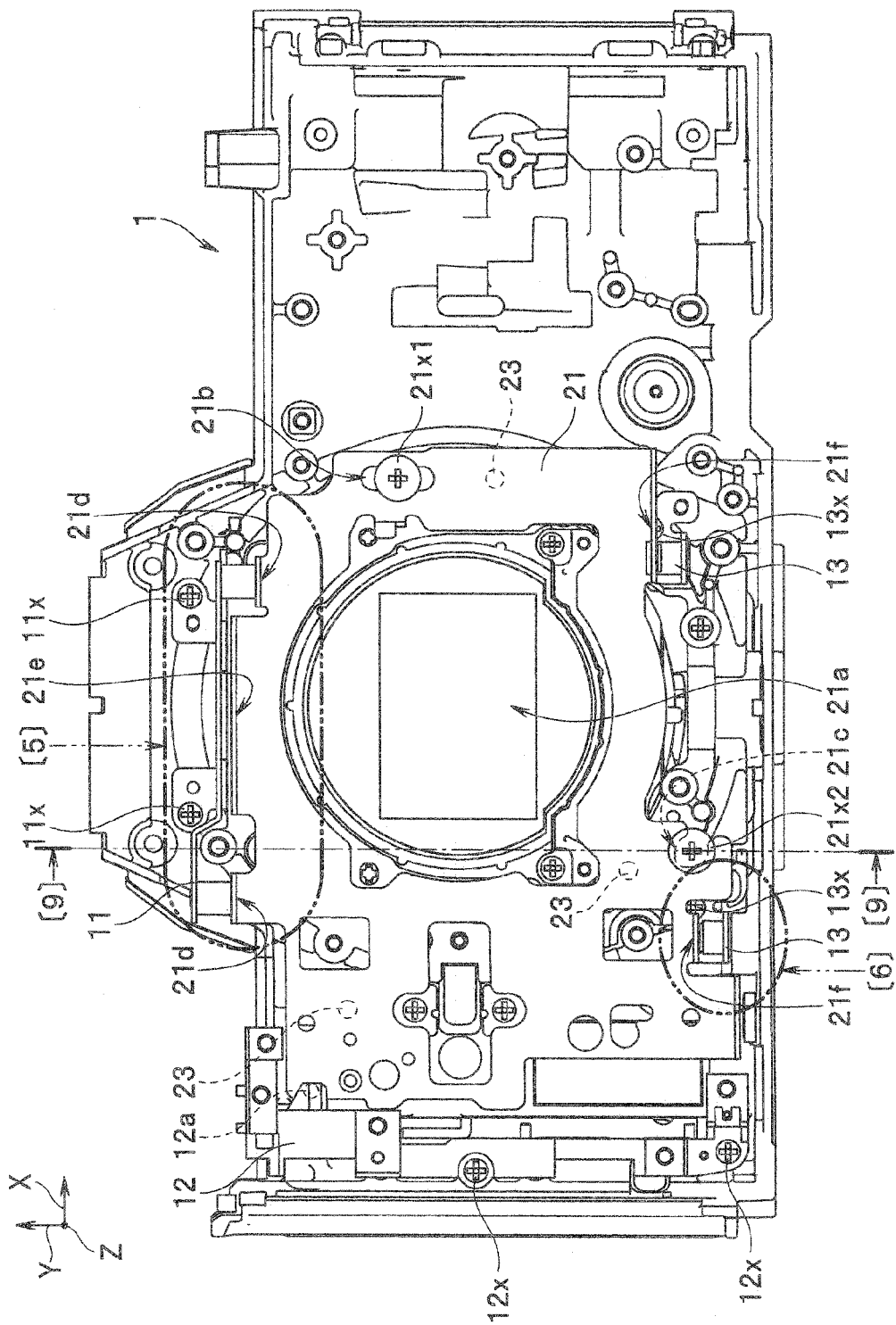
FIG. 8 is an assembly diagram showing a state that the shutter holding mechanism is attached inside a front cover member, in the camera to which the shutter holding mechanism of the present embodiment is applied.

FIG. 8 is an assembly diagram showing a state that the shutter holding mechanism is attached inside a part of the camera body (the front cover member) in the camera to which the shutter holding mechanism of the present embodiment is applied. In FIG. 8, in order to show a configuration of the shutter holding mechanism attached inside the part of the camera body (the front cover member), a state when the part of the camera body (the front cover member) is shown from a rear surface side is shown, and the shutter unit attached to the shutter holding mechanism is not shown. Note that areas indicated by reference numerals [5] and [6] in FIG. 8 correspond to the enlarged diagrams of FIGS. 5 and 6 described in the above first embodiment.

Figure 9:
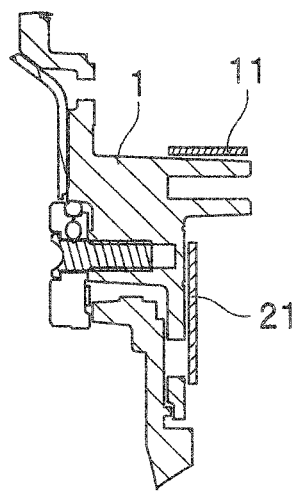
FIG. 9 is a longitudinal sectional view along a line indicated by reference numeral [9]-[9] in FIG. 8.
Figure 9:
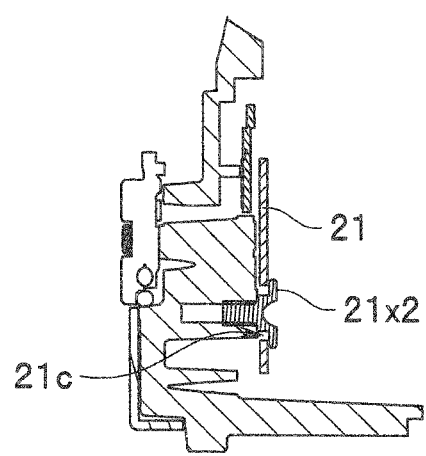
Figure 10:
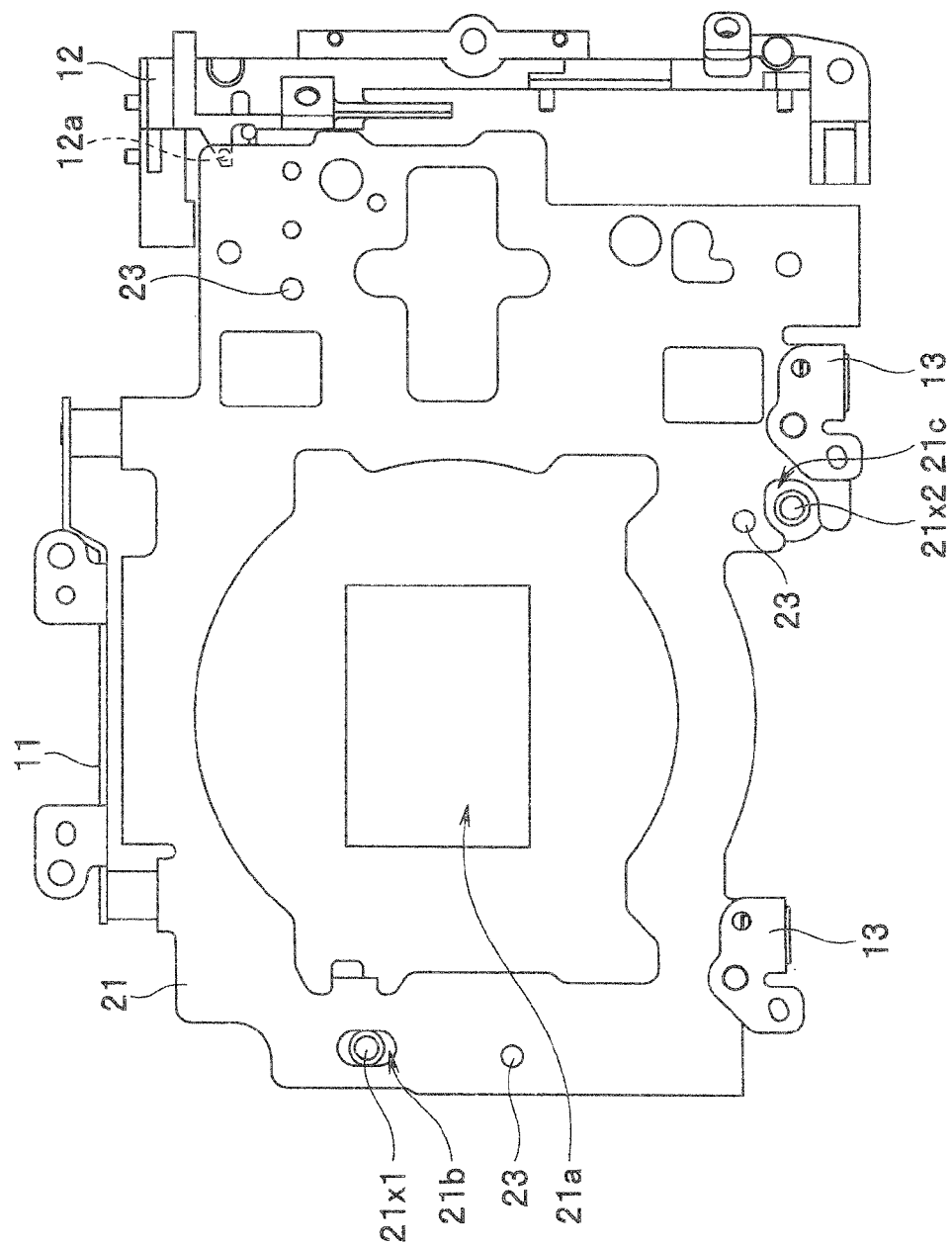
FIG. 10 is an enlarged diagram of a main part when the shutter holding mechanism of the present embodiment is taken out and seen from a front side.

FIG. 9 is a longitudinal sectional view along a line indicated by reference numeral [9]-[9] in FIG. 8. FIG. 10 is an enlarged diagram of a main part when the shutter holding mechanism of the present embodiment is taken out and seen from a front side thereof.

The shutter holding mechanism of the present embodiment is configured with components almost similar to those of the above first embodiment. That is, the shutter holding mechanism is a configuration portion for holding a focal-plane type shutter unit relative to a configuration member constituting the camera body, inside the camera body.

More specifically, a shutter unit 2 is held in a rear section of the front cover member 1 constituting a part of the camera body such that the shutter unit 2 is movable in a predetermined direction (to be described in detail later; the travel direction of the shutter blade) via the shutter holding mechanism of the present embodiment and rotatable with a predetermined position (to be described in detail later) as a rotation center (see FIG. 1).

A detailed configuration of the shutter holding mechanism of the present embodiment will be described below with the use of FIGS. 7 to 10 and, further, with reference to FIGS. 1, 5 and 6 used for the description of the above first embodiment.

The shutter holding mechanism of the present embodiment is similar to that of the above first embodiment in a point that the shutter holding mechanism is configured mainly with a slider 21, a pressing spring unit 11, a slider weight 12, a damper unit 13 and the like.

The slider 21 is a shutter substrate to which the shutter unit 2 is fixed. The slider 21 (the shutter substrate) is attached to an inner-side surface of the front cover member 1 so as to be movable in a direction along the travel direction of the shutter blade (not shown) of the shutter unit 2 (the Y-axis direction) and rotatable with the predetermined position (to be described in detail later) as the rotation center by a structure to be described later.

The slider 21 is formed by performing bending processing of a rigid plate member, for example, made of metal. The shutter unit 2 is fixed to the slider 21 as described above. More specifically, as shown in FIGS. 1 and 7, the shutter driving portion 20 of the shutter unit 2 is fixed to a region on one end side in an X-axis direction on a rear surface side of the slider 21, the region being close to a side edge portion from a central part. Further, an opening 21a, which is a piercing opening portion, is formed at a substantially central part of the slider 21. The shutter blade (not shown) is included near the opening 21a.

Note that, in a state that the shutter unit 2 is attached to the front cover member 1 via the shutter holding mechanism including the slider 21, and, further, the image pickup unit 3 is joined on the rearward side thereof, the opening 21a of the slider 21 is set so as to be arranged at a position where the center of the opening 21a almost corresponds to both of the center of the opening 10a of the front cover member 1 and the center of the light receiving surface of the image pickup device 30 simultaneously. Thereby, a light path of light from an object which is transmitted through the image pickup optical system of the lens barrel (not shown) fitted via the mount ring 10 of the front cover member 1 and enters the camera is secured. The shutter blade (not shown) of the shutter unit 2 opens and closes the opening 21a at an appropriate timing accompanying an image pickup operation. Thereby, when the opening 21a is in an open state, an object light passes through the opening 21a.

As shown in FIG. 3, in a state that the slider 21 is attached to the front cover member 1 (the state in FIG. 3), a plurality of bent portions are formed at both Y-axis direction ends of the slider 21. More specifically, on one end portion side (an upper end side in the present example) of the slider 21, a plurality of bent portions 21d, 21e which are bent rearward are formed along a Z-axis direction. Here, two bent portions 21d are formed, and the two bent portions 21d are arranged sandwiching the other bent portion 21e. The plurality of bent portions 21d, 21e, 21d are formed on a side edge portion on the one end portion side (on the upper end side) in the Y-axis direction from an area where the opening 21a of the slider 21 is formed.

Further, on the other end portion side (a lower end side in the present example) of the slider 21, a plurality of (two in the present example) bent portions 21f which are bent rearward are formed along the Z-axis direction. The two bent portions 21f are formed on a side edge portion on the other end portion side (the lower end side) in the Y-axis direction from the area where the opening 21a of the slider 21 is formed.

The plurality of bent portions 21d, 21e, 21f are regions which a buffer unit as buffering means configured by the pressing spring unit 11 and the damper unit 13, comes into contact with and acts on, though details will be described later.

Further, as shown in FIG. 8, the slider 21 is fixedly held relative to an inner surface side of the front cover member 1 by two screws 21x1, 21x2 and the slider weight 12 such that movement in the Z-axis direction is restricted. Here, the slider weight 12 is fixed to the inner surface side of the front cover member 1 by the two screws 12x. As shown in FIGS. 7 and 8, an arm portion 12a projecting in the X-axis direction is formed on the slider weight 12. A spherical convex portion arranged projecting forward is formed on the arm portion 12a. When the slider 21 is attached to the inner side surface of the front cover member 1, and the slider weight 12 is in a state of being fixed to a predetermined position of the front cover member 1 by the screws 12x (the state in FIG. 8), the spherical convex portion of the arm portion 12a of the slider weight 12 comes into point contact with one side edge portion (a corner part) of a plane on the rear surface side of the slider 21 and supports the slider 21 in the Z-axis direction. Simultaneously, the slider 21 is fixedly held by the two screws 21x1, 21x2 in a long hole 21b made near the other side edge portion and in a notch portion 21c formed near a side edge portion close to the other end portion side (a lower end portion), respectively, while movement in the Z-axis direction is restricted.

Here, the long hole 21b is formed in a long groove shape having a longer axis in the Y-axis direction. The notch portion 21c is formed in a shape having an almost circular-shaped hole portion larger than a diameter of a shaft part of the screw 21x2, a part of a peripheral portion of the hole portion being notched so that a part of one edge portion of the slider 21 is open, as shown in FIG. 10. Therefore, by such a configuration, the slider 21 is permitted to move in the Y-axis direction while movement in the Z-axis direction is restricted, by the long hole 21b and the notch portion 21c, and is permitted to rotationally move with the screw 21x1 insertedly arranged in the long hole 21b as the rotation center.

Note that the shutter unit 2 is fixedly arranged on the slider 21 (the shutter substrate) as described above. In this case, in a direction along the X axis on a plane of the slider 21, the shutter driving portion 20 and the long hole 21b described above are arranged in both lateral areas, sandwiching the opening 21a therebetween. In other words, as for the shutter driving portion 20 and the long hole 21b described above, the shutter driving portion 20 of the shutter unit 2 is arranged on one side of the opening 21a, and the long hole 21b is arranged on the other side, in a direction perpendicular to the travel direction (the Y-axis direction) of the shutter blade (the X-axis direction) in a plane including the travel direction of the shutter blade; and, corresponding thereto, the screw 21x1 (a receiving portion to be described later) engaged with the long hole 21b is arranged on the front cover member 1 (the camera body).

Thus, the slider 21 is supported at three points relative to the front cover member 1 in the Z-axis direction. In this case, the support points of the slider 21 in the Z-axis direction are a region which the spherical convex portion of the slider weight 12 comes into contact with, a region where the screw 21x1 near the other side edge portion is arranged (a region of the long hole 21b), and a region where the screw 21x2 near the other end portion side (the lower end side) is arranged (a region of the notch portion 21c). That is, the slider 21 is supported in the Z-axis direction at three points arranged almost equally in a circumference direction on a peripheral portion of the opening 21a.

In other words, the above three support points, that is, the region which the spherical convex portion of the slider weight 12 comes into contact with, the region where the screw 21x1 near the other side edge portion is arranged (the region of the long hole 21b), and the region where the screw 21x2 near the other end portion side (the lower end side) is arranged (the region of the notch portion 21c) are a plurality of receiving portions at the time of the slider 21 moving parallel to a surface orthogonal to an optical axis O (the Z axis) of a light flux from an object, that is, an XY plane, on a peripheral area on an outer side of the opening 21a. Here, on the slider 21 (the shutter substrate), the above plurality of receiving portions are formed at least three positions on the front cover member 1 (the camera body) surrounding the opening 21a, and are arranged so that a substantial triangle surrounding the optical axis O of an object light is formed.

As described above, by the screw 21x1 near the other side edge portion, among the plurality of receiving portions (at three positions), being engaged with the long hole 21b of the slider 21, the slider 21 is guided to move in the travel direction of shutter blade (the Y-axis direction). By the screw 21x2 near the other end side being engaged with the notch portion 21c of the slider 21, the slider 21 is permitted to move in the Y-axis direction and enabled to rotate with the screw 21x1 as the center.

Further, three rolling members (balls) 23 intervene between the slider 21 and the front cover member 1 as shown in FIG. 8. The three rolling members 23 are also arranged almost equally in the circumference direction on the peripheral portion of the opening 21a and support the slider 21 at the three points from the front surface side thereof.

The pressing spring unit 11 is a pressing unit which presses the shutter substrate 21 against the front cover member 1 toward the other end portion side (the lower end side) of the shutter substrate 21. Therefore, the pressing spring unit 11 is fixed to the inner side surface of the front cover member 1 constituting a part of the camera body with screws 11x. Here, the pressing spring unit 11 is arranged at a position facing one side edge portion of one end portion side (the upper end side) of the slider 21 (the shutter substrate).

In the damper unit 13 in the present embodiment also, the substrate 13a having the bent portion 13b is fixed to the inner side surface of the front cover member 1 (the camera body) with screws 13x similarly to the above first embodiment. The cylinder 13c and the cover screw 13e are integrally arranged on the substrate 13a. At this time, the elastic member 13d is expandably and contractibly arranged between the inner side surface of the flange portion of the cylinder 13c and the inner side surface of the bent portion 13b. In other words, the elastic member 13d is arranged between the flange portion of the cylinder 13c (a moving member; to be described later) and the camera body (the bent portion 13b of the substrate 13a fixed to the camera body).

By this configuration, when the flange portion of the cylinder 13c receives the other end portion side (the bent portion 21f on the other end portion side) of the slider 21 (the shutter substrate), the cylinder 13c and the cover screw 13e move in the direction along the Y-axis direction (the travel direction of the shutter blade of the shutter unit) relative to the front cover member 1 (the camera body).

Here, the cylinder 13c and the cover screw 13e are a moving member which is integrally configured by being engaged with each other as described above and which moves in the direction along the travel direction of the shutter blade (not shown) of the shutter unit 2 relative to the front cover member 1 (the camera body) by being pressed by the other end portion (the bent portion 21f on the lower end side) of the slider 21 (the shutter substrate) pressed by the pressing spring unit 11.

In the present embodiment, the pressing spring unit 11 and the damper unit 13 which are configured as described above function as a buffer unit which prevents the slider 21 (the shutter substrate) from hitting the front cover member 1 (the camera body) when the slider 21 (the shutter substrate) moves.

When the shutter holding mechanism of the present embodiment is in a normal state, the bent portion 21f (the shutter substrate) of the slider 21 is in a state of being in contact with the flange portion of the cylinder 13c as described above. That is, at this time, the slider 21 is in a state of being placed on the flange portion of the cylinder 13c by its own weight.

When, in this state, the shutter unit is driven, and the shutter blade (not shown) travels from one end portion side (the lower end side) of the slider 21 toward the other end portion side (the upper end side) in the Y-axis direction, the slider 21 on which the shutter unit is placed moves in a direction opposite to the travel direction of the shutter blade in response to travel reaction of the travel and the like. At this time, the shutter driving portion 20 is fixedly arranged on the slider 21, at a region close to a side edge in the X-axis direction relative to the opening 21a formed in the almost central area of the slider 21. Further, the slider 21 is held in the long hole 21b provided on an opposite side of the opening 21a in the X-axis direction relative to the region where the shutter driving portion 20 is arranged such that it is movable in the Y-axis direction and rotatable with the screw 21x1 engaged with the long hole 21b as the center.

Therefore, as described above, when travel reaction and the like of the shutter blade acts on the slider 21, the slider 21 linearly moves in the direction opposite to the travel direction of the shutter blade in the Y-axis direction along the long hole 21b. Simultaneously, the slider 21 rotationally moves with the screw 21x1 engaged with the long hole 21b as the center. Then, in response thereto, the moving member (what is configured integrally with the cylinder 13c and the cover screw 13e) linearly moves in the same direction (the direction opposite to the travel direction of shutter blade).

At this time, the elastic member 13d expands in the direction along the travel direction of the shutter blade (not shown) of the shutter unit in the Y-axis direction. Simultaneously, the bent portion 21e of the slider 21 comes into contact with the buffer member 11e. Thereby, the elastic member 13d and the buffer member 11e absorb movement vibration of the slider 21.

On the other hand, depending on an external force or the like received then, the slider 21 may move in the same direction as the travel direction of the shutter blade. In this case, the moving member (what is configured integrally with the cylinder 13c and the cover screw 13e) moves in the same direction. Then, at this time, the elastic member 13d contracts in the direction along the travel direction of the shutter blade (not shown) of the shutter unit in the Y-axis direction. Thereby, the elastic member 13d absorbs the movement vibration of the slider 21.

In this way, the damper unit 13 absorbs the movement vibration (linear movement and rotational movement) of the slider 21 (the shutter substrate) against the front cover member 1 (the camera body) by the moving member (13c, 13e) linearly moving in the Y-axis direction, which is along the travel direction of the shutter blade, and causing the elastic member 13d to expand/contract.

As described above, according to the above second embodiment, a configuration is made such that the movement vibration by linear movement and rotational movement of the slider 21 is absorbed by holding the slider 21 (the shutter substrate) on which the focal-plane type shutter unit is fixedly arranged relative to the front cover member 1 (the camera body), such that it is linearly movable in the direction along the travel direction of the shutter blade (the Y-axis direction) and is rotatable with the screw 21$x$1 as the center, and providing the pressing spring unit 11 and the damper unit 13 at one end portion and the other end portion of the slider 21 in the Y-axis direction.

Therefore, by such a configuration, the slider 21 (the shutter substrate) on which the shutter unit is fixedly arranged can be in such a structure that the slider 21 is linearly movable in the travel direction of the shutter blade (the Y-axis direction) and is rotationally movable by the pressing spring unit 11 and the damper unit 13 and, in the normal state, can be always held in a stable state.

Further, by causing the slider 21 to linearly and rotationally move together with the shutter unit by the travel reaction of the shutter blade generated at the time of driving the shutter unit, and the pressing spring unit 11 and the damper unit 13 absorbing vibration of the movement, it is possible to reduce and suppress the vibration and the like transmitted to the camera body side. Therefore, it is possible to reduce vibration and the like of the camera body, the image pickup unit and the like which occur accompanying driving of the shutter unit and, therefore, prevent occurrence of image blur and the like. Therefore, it is possible to always obtain a preferable image pickup result.

Furthermore, the slider 21 is in such a structure that the slider 21 is held relative to the front cover member 1 such that movement in the Z-axis direction is restricted by the screw 21$x$1 (a convex-shaped portion), the long hole 21$h$ (an opening portion), the screw 21$x$2 and the notch portion 21$c$ while linear movement in the Y-axis direction and rotational movement with the screw 21$x$1 as the center are permitted.

Therefore, by such a configuration, it is possible to cause the slider 21 on which the shutter unit is fixedly arranged to linearly move in a desired direction, that is, in the Y-axis direction, which is the travel direction of the shutter blade, and, therefore, it is possible to secure stability of the position of the shutter unit inside the camera body.

Note that, though, in the present embodiment, an interchangeable lens camera body h s been described as an example of a form of a camera to which the shutter holding mechanism is applied, the camera is not limited to the form. For example, even in the case of a camera in a form of a lens barrel being fixed on a front surface of a camera body, it is possible to apply the shutter holding mechanism of the present invention thereto quite similarly.

Further, the present invention is not limited to the embodiment described above, and it is, of course, possible to make various variations and applications within a range not departing from the spirit of the invention. Furthermore, the above embodiment includes inventions at various stages, and various inventions can be extracted by appropriately combining a plurality of disclosed constituent features. For example, even if some constituent features are deleted from all constituent features shown in the above embodiment, a configuration obtained after deleting the constituent features can be extracted as an invention if the problem to be solved by the invention can be solved, and the advantageous effects of the invention can be obtained. Furthermore, components of different embodiments may be appropriately combined. The present invention is only limited by accompanying claims and not restricted by any practiced aspect.

What is claimed is:

1. A shutter holding mechanism comprising:
    a shutter substrate which is provided inside a camera body and in which a focal-plane type shutter unit is fixed;
    a pressing spring unit arranged between the camera body and a side of one end portion of the shutter substrate, the pressing spring unit including a first energizing member pressing the shutter substrate to a side of another end portion of the shutter substrate relative to the camera body, and a buffer member that absorbs impact received from the shutter substrate, the buffer member being arranged at a position distanced from the shutter substrate so as to be in non-contact with the shutter substrate when the shutter substrate is not moved, and the buffer member being brought into contact with the shutter substrate only when the shutter substrate is moved by impact;
    a damper unit arranged in a part on a side of the camera body corresponding to the side of the other end portion of the shutter substrate, which is a side opposite to a part where the pressing spring unit is arranged, in a direction along a travel direction of a shutter blade of the shutter unit, the damper unit absorbing impact on the shutter substrate pressed by the pressing spring unit; and
    a holding portion that holds the shutter substrate with respect to the camera body and restricts the shutter substrate from moving in a direction perpendicular to the direction along the travel direction of the shutter blade,
    wherein, when the shutter substrate has received a first impact in a first direction along the travel direction of the shutter blade of the shutter unit, the shutter substrate is allowed to move only in the first direction by the holding portion within a range of an elastic force of the first energizing member, and when the shutter substrate has received a second impact larger than the first impact in the first direction, the shutter substrate moves only in a direction along the first direction by the holding portion and the second impact is absorbed by the buffer member.

2. The shutter holding mechanism according to claim 1, wherein the holding portion includes:
    a rotatable roller arranged with respect to the camera body, the roller restricting the shutter substrate from moving in the direction perpendicular to the direction along the travel direction of the shutter blade and permitting the shutter substrate to move in the direction along the travel direction of the shutter blade, and
    an opening portion arranged in the shutter substrate and having a longer axis in the direction along the travel direction of the shutter blade,
    wherein the opening portion is formed so as to have a width dimension almost equal to or a little larger than a diameter of the roller.

3. The shutter holding mechanism according to claim 1, wherein the holding portion includes:
    a convex-shaped portion arranged on one of the shutter substrate and the camera body; and
    an opening portion arranged on another of the shutter substrate and the camera body;
    wherein the shutter substrate is arranged such that the shutter substrate is movable only in the direction along the travel direction of the shutter blade of the shutter unit by the convex-shaped portion and the opening portion.

4. The shutter holding mechanism according to claim 1, wherein the damper unit comprises:
   a receiving portion receiving the other end portion of the shutter substrate pressed by the pressing spring unit and a positioning portion performing positioning relative to the camera body;
   a second energizing member arranged between the receiving portion and the camera body; and
   a moving member moving against an energizing force of the second energizing member, in a direction opposite to the first direction relative to the camera body to absorb an impact when the receiving portion receives the other end portion of the shutter substrate.

5. The shutter holding mechanism according to claim 4, wherein the moving member comprises:
   a first tube member where the receiving portion is formed in a flange shape, and one end portion of the second energizing member comes into contact with the camera body, the first tube member receiving another end portion of the second energizing member on a side opposite to the receiving portion; and
   a second tube member where the positioning portion is formed in a flange shape, the second tube member being engaged with the first tube member.

6. The shutter holding mechanism according to claim 1, wherein the first direction is from the side of the other end portion toward the side of the one end portion of the shutter substrate.

7. A shutter holding mechanism comprising:
   a shutter substrate comprising a focal-plane type shutter unit and an opening portion through which an object light passes, wherein a long groove is formed parallel to a travel direction of a shutter blade of the shutter unit;
   a pressing unit arranged between the camera body and a side of one end portion of the shutter substrate, the pressing unit pressing the shutter substrate to a side of another end portion of the shutter substrate relative to the camera body;
   a damper unit arranged in a part on a side of the camera body corresponding to the side of the other end portion of the shutter substrate, which is a side opposite to a part where the pressing unit is arranged, in a direction along the travel direction of the shutter blade of the shutter unit, the damper unit absorbing movement of the shutter substrate pressed by the pressing unit; and
   a plurality of receiving portions formed at at least three positions on the camera body and forming a receiving surface at a time of the shutter substrate moving in a plane perpendicular to an optical axis of the object light on an outer side of the opening portion of the shutter substrate;
   wherein one of the plurality of receiving portions is engaged with the long groove formed on the shutter substrate to guide the shutter substrate to move in the travel direction of the shutter blade, and enable the shutter substrate to rotate with the receiving portion engaged with the long groove as a center.

8. The shutter holding mechanism according to claim 7, wherein the plurality of receiving portions are provided at three positions on the camera body such that the receiving portions surround the opening portion; and
   wherein the three receiving portions are arranged such that the receiving portions form a triangle surrounding the optical axis of the object light.

9. The shutter holding mechanism according to claim 7, wherein, on the shutter substrate, in a direction perpendicular to the travel direction of the shutter blade in a plane including the travel direction, a shutter driving portion of the shutter unit and the receiving portion engaged with the long groove are arranged on one of two sides, respectively, sandwiching the opening portion.

10. The shutter holding mechanism according to claim 7, wherein the damper unit absorbs at least one of linear movement at the time of the shutter substrate moving along the long groove and rotational movement of the shutter substrate.

11. The shutter holding mechanism according to claim 7, wherein the damper unit absorbs rotation of the shutter substrate by linear movement.

12. The shutter holding mechanism according to claim 10, wherein the damper unit comprises:
   a moving member being pressed by the other end portion of the shutter substrate pressed by the pressing unit and moving in the direction along the travel direction of the shutter blade of the shutter unit relative to the camera body; and
   an elastic member arranged between the moving member and the camera body.

13. The shutter holding mechanism according to claim 11, wherein the damper unit comprises:
   a moving member being pressed by the other end portion of the shutter substrate pressed by the pressing unit and moving in the direction along the travel direction of the shutter blade of the shutter unit relative to the camera body; and
   an elastic member arranged between the moving member and the camera body.

* * * * *